(12) United States Patent
Levesque et al.

(10) Patent No.: US 11,593,681 B2
(45) Date of Patent: Feb. 28, 2023

(54) SYNTHESIZING DISPARATE DATABASE ENTRIES FOR HARDWARE COMPONENT IDENTIFICATION

(71) Applicant: CAMP Systems International, Inc., Merrimack, NH (US)

(72) Inventors: Heather O Levesque, New Brunswick (CA); James E Allman, Jr., Mephis, TN (US); Lisa K Garcia, Olive Branch, MS (US); Jason W Buhro, Austin, TX (US); Sean M Lanagan, Concord, MA (US); John P Herrman, Eads, TN (US)

(73) Assignee: CAMP Systems International, Inc., Merrimack, NH (US)

( * ) Notice: Subject to any disclaimer, the term of this patent is extended or adjusted under 35 U.S.C. 154(b) by 90 days.

(21) Appl. No.: 17/213,122

(22) Filed: Mar. 25, 2021

(65) Prior Publication Data

US 2022/0309362 A1    Sep. 29, 2022

(51) Int. Cl.
*G06F 16/21* (2019.01)
*G06F 16/2455* (2019.01)
*G06F 16/248* (2019.01)
*G06N 20/00* (2019.01)
*G06N 5/04* (2006.01)

(52) U.S. Cl.
CPC ............ *G06N 5/04* (2013.01); *G06F 16/219* (2019.01); *G06F 16/248* (2019.01); *G06F 16/24552* (2019.01); *G06N 20/00* (2019.01)

(58) Field of Classification Search
CPC ........ G06N 5/04; G06N 20/00; G06F 16/219; G06F 16/24552; G06F 16/248
See application file for complete search history.

(56) References Cited

U.S. PATENT DOCUMENTS 8,620,936 B2 * 12/2013 Lake .................. G06F 16/2452
707/602
8,856,134 B2 * 10/2014 Hadley ................. G06Q 10/06
707/741
9,600,944 B1 * 3/2017 Garel ....................... G07C 5/08
(Continued)

OTHER PUBLICATIONS

PCT International Search Report and Written Opinion, PCT Application No. PCT/US2022/021202, dated Jul. 20, 2022, 23 pages.
(Continued)

*Primary Examiner* — Jorge A Casanova
(74) *Attorney, Agent, or Firm* — Fenwick & West LLP

(57) ABSTRACT

A device retrieves historical data and new data each a respective hardware component identifier and a respective associated value. The device creates a synthesized set of data by having subsets for anomalous data, data that is associated with an attenuation signal, and other data. The device discards the anomalous data and weights the data associated with an attenuation signal. The device generates a searchable database, the searchable database including each hardware component named by an entry of the synthesized set of data, along with an associated value determined based on the weighted value of the entry. The device receives user input of a search query, and outputs search results based on a comparison of the user input of the search query to entries of the searchable database.

20 Claims, 6 Drawing Sheets

(56) References Cited

U.S. PATENT DOCUMENTS

| | | | |
|---|---|---|---|
| 10,949,814 B1* | 3/2021 | Nelson | G06N 20/00 |
| 2002/0010618 A1* | 1/2002 | Pellegrinelli | G06Q 40/04 |
| | | | 345/440 |
| 2007/0156496 A1* | 7/2007 | Avery | G06Q 10/20 |
| | | | 705/305 |
| 2008/0065594 A1* | 3/2008 | Faunce | G06F 16/24545 |
| 2008/0103996 A1* | 5/2008 | Forman | G06N 20/00 |
| | | | 706/12 |
| 2008/0177439 A1* | 7/2008 | Betters | G01C 23/005 |
| | | | 701/33.4 |
| 2014/0121885 A1* | 5/2014 | Schoonveld | G06Q 10/10 |
| | | | 701/29.3 |
| 2015/0199224 A1* | 7/2015 | Mihnev | H04L 41/142 |
| | | | 714/37 |
| 2015/0317357 A1* | 11/2015 | Harmsen | G06F 16/2228 |
| | | | 707/723 |
| 2016/0055220 A1* | 2/2016 | Joshi | G06F 16/319 |
| | | | 707/722 |
| 2016/0078367 A1* | 3/2016 | Adjaoute | G06N 20/00 |
| | | | 706/12 |
| 2017/0193400 A1 | 7/2017 | Bhaskar et al. | |
| 2017/0286809 A1 | 10/2017 | Pankanti et al. | |
| 2018/0204160 A1* | 7/2018 | Chehade | H04L 67/75 |
| 2019/0092495 A1* | 3/2019 | Lu | B64F 5/60 |
| 2019/0295331 A1* | 9/2019 | Amit | G06Q 10/06 |
| 2020/0322703 A1* | 10/2020 | Bures | G06N 20/00 |
| 2021/0240683 A1* | 8/2021 | McCain | G06F 16/217 |

OTHER PUBLICATIONS

Spellings, M. et al. "Machine learning for crystal identification and discovery," AIChE Journal, vol. 64, No. 6, Mar. 28, 2018, pp. 2198-2206.

* cited by examiner

600

602
retrieve historical data from a plurality of source databases, the historical data comprising entries each including a hardware component identifier and an associated value

604
receive new data from a plurality of input databases, the new data comprising a respective hardware component identifier and a respective associated value

606
Generate a synthesized set of data

608
Update the synthesized set of data

610
Generate a searchable database, the searchable database including each hardware component named by an entry of the synthesized set of data, along with an associated value determined based on the weighted value of the entry

612
receive user input of a search query

614
Output search results based on a comparison of the user input of the search query to entries of the searchable database

FIG. 6

SYNTHESIZING DISPARATE DATABASE ENTRIES FOR HARDWARE COMPONENT IDENTIFICATION

TECHNICAL FIELD

The disclosure generally relates to the field of machine learning, and more particularly relates to effective training of machine learning to evaluate hardware components.

BACKGROUND

Aircraft hardware component suppliers and entities responsible for operating and maintaining aircraft do not have access to consensus values corresponding to those hardware components. Existing processes for deriving values are subject to back-and-forth network communications that expend unnecessary bandwidth, both in the needless two-way communications and duplication of communications across multiple entities, and that can take long amounts of time to resolve. Moreover, the existing processes are subject to data entry errors thus resulting in inaccuracy.

SUMMARY

Systems and methods are disclosed herein for training and applying a machine-learned model to determine consensus values for aircraft hardware components. The model is trained in an advantageous manner that avoids a need to maintain large data lakes of historical training data, while still enabling re-training of the model based on new data and/or depreciation of old data. The model is used to generate a searchable database for resolving queries associated with a hardware component. In responding to queries, confidences output by the model may be provided in addition to aircraft hardware component values, thus enabling simple identification of aircraft hardware components that are subject to large variance.

In an embodiment, a device trains a machine-learned model. The training may include retrieving a plurality of entries from a database, each entry corresponding a respective hardware component to a respective value, and inputting at least a portion of data of each respective entry into a weighting model, the weighting model outputting a weight to be applied to each respective value. The device may then generate a training set, the training set having training data formed by pairing each respective hardware component as a label as paired to their respective values as weighted by their respective weights. The device may finally train the machine-learned model using the training set.

The device may receive new data comprising a hardware component and a respective value, and may generate weighted new data by inputting the new data into the weighting model, the weighting model outputting a weight to be applied to the respective value of the new data. The device re-trains the machine-learned model using the training set and the weighted new data.

Following training and any amount of iteration of re-training, responsive to detecting a trigger, the device generates, using the machine-learned model, a searchable database. The device receives a query from a user comprising an indicated hardware component, searches the searchable database for a result matching the query, and outputs a result including a value for the indicated hardware component and a confidence that the value is correct.

In an embodiment, the device retrieves historical data from a plurality of source databases, the historical data including entries each including a hardware component identifier and an associated value. The device receives new data from a plurality of input databases, the new data comprising a respective hardware component identifier and a respective associated value. The device creates a synthesized set of data by identifying a first subset of data comprising data from the historical data and the new data that is associated with an anomaly, identifying a second subset of data from the historical data and the new data that is associated with an attenuation signal, and identifying a third subset of data from the historical data and the new data that includes data not assigned to the first subset or the second subset.

The device updates the synthesized set of data by discarding or archiving the first subset of data from the synthesized set of data, and by weighting each entry of the second subset of data based on its respective attenuation signal. The device generates a searchable database, the searchable database including each hardware component named by an entry of the synthesized set of data, along with an associated value determined based on the weighted value of the entry. The device receives receiving user input of a search query, and outputs search results based on a comparison of the user input of the search query to entries of the searchable database.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG.) 1 illustrates one embodiment of a system environment for operating a hardware component service.

FIG. 6 is a flow diagram showing another exemplary process for generating a searchable database.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment of Hardware Component Service

Figure 1:
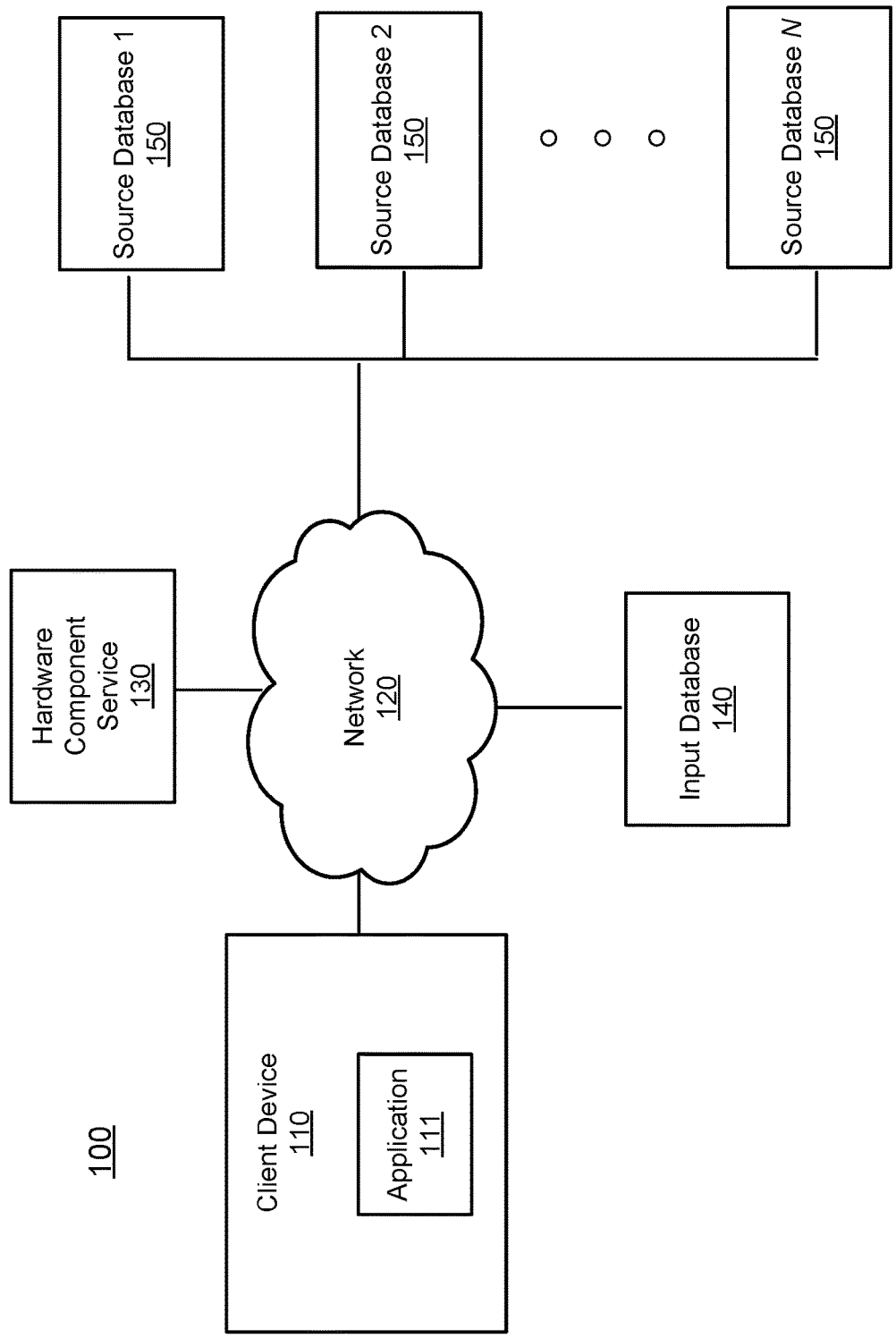

FIG. 1 illustrates one embodiment of a system environment for operating a hardware component service. As depicted in FIG. 1, environment 100 includes client device 110 with application 111 installed thereon, network 120, hardware component service 130, input database 140, and source databases 150. Client device 110 may be any device configured to receive input from a user and communicate with aircraft component service 130. Exemplary client devices include personal computers, smartphones, tablets, Internet-of-Things (IoT) devices, laptops, kiosks, and so on. Communications between client device 110 and hardware component service 130 may be managed by application 111.

Application 111 may be a specialized application (e.g., downloaded from hardware component service 130 or provided by aircraft component service 130 for download through a third-party system), or may be accessed through a browser installed on client device 110. Application 111 may be used to enter a search query relating to a hardware component.

Network 120 may be any network that transmits data communications between at least client device 110 and hardware component service 130. Network 120 may transmit data communications between any entity shown in FIG. 1, as well as any entity discussed herein but not shown in FIG. 1. Exemplary data networks include the Internet, a wide area network, a local area network, a WiFi network, and any other network that transfers data between electronic devices.

Hardware component service 130 uses both historical and new data entries relating to hardware components to generate a searchable database (e.g., input database 140). Hardware component service 130 may be driven by a machine learning model that is trained using one or both of the historical and new data entries. Further details about hardware component service 130 are described with reference to FIG. 2 below.

Input database 140 stores one or more searchable databases generated by hardware component service 130. Hardware component service 130 may search input database 140 responsive to receiving a query relating to a given hardware component. While depicted as a separate entity from hardware component service 130, input database 140 may be stored within the boundaries of hardware component service 130. Source databases 150 house historical and new data entries relating to hardware components, and provide this data to hardware component service 130.

Exemplary Particulars of Hardware Component Service

Figure 2:
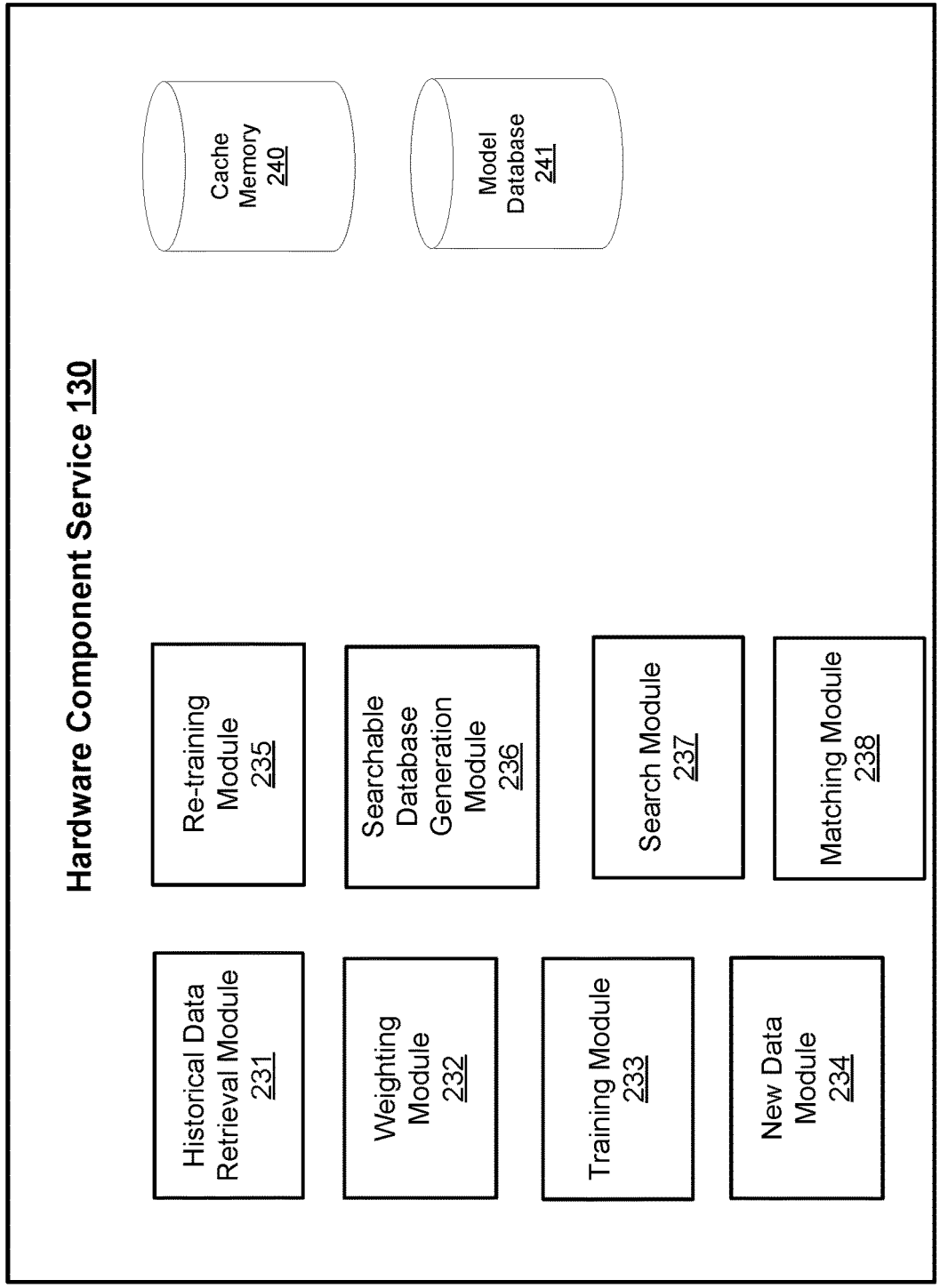
FIG. 2 illustrates one embodiment of exemplary modules and databases used by the hardware component service.

FIG. 2 illustrates one embodiment of exemplary modules and databases used by the hardware component service. As depicted in FIG. 2, hardware component service 130 includes historical data retrieval module 231, weighting module 232, training module 233, new data module 234, re-training module 235, searchable database generation module 236, search module 237, matching module 238, cache memory 240, and model database 241. The modules and databases depicted in FIG. 2 are merely exemplary; fewer or more modules and/or databases may be used to achieve the functionality described herein. Moreover, some or all functionality of hardware component service 130 may be distributed and/or instantiated at client device 110 (e.g., on application 111) and/or at source database 140.

Historical data retrieval module 231 retrieves historical data from any number of databases (e.g., source databases 150). The historical data includes entries that reference both a particular airplane hardware component, and a value associated therewith. Historical data retrieval module 231 may identify source databases 150 through any known means, such as scraping web data having references to known hardware components. The references to known hardware components may be any identifying feature of a hardware component, such as a name, model number, serial number, or any other identifier. Historical data may include any data referencing any known hardware component, regardless of whether it is old data (e.g., 50 or more years old), inaccurate data, or from sources that are disreputable (e.g., based on internally calculated or third-party calculated trust scores relating to the sources).

Historical data retrieval module 231 may store the retrieved historical data in cache memory 240. Cache memory 240 may be any memory that stores readily-retrievable data, as distinguished from non-cache memory which stores data having latency that cannot be accessed in less than a given threshold amount of time. Cache memory 240 may be stored on one or more servers of hardware component service 130 and/or may be in whole or in part stored using a third-party service.

Weighting module 232 determines weights to apply to values corresponding to hardware components as indicated in each entry of the historical data. In an embodiment, weights may be applied based on heuristics, where the heuristics together are referred to as a weighting model. For example, anomalies and attenuation signals may be pre-defined. The term anomaly, as used herein, may refer to an artifact within a data entry that, if found, causes the data entry to be discarded or fully discounted to a zero weight or a de minimus weight. The term attenuation signal, as used herein, may refer to an artifact within a data entry that, if found, causes the data entry to be discounted—that is, weighted to less than a normal unit of weight.

Anomalies and attenuation signals may be defined by an administrator or user of the system. An amount to discount an entry having an anomaly and/or an attenuation signal, or whether to discard a data entry having an anomaly, may be pre-defined by an administrator or user of hardware component service 130. An exemplary anomaly may be a data entry having an artifact indicative of a source that is known to be fraudulent. Another exemplary anomaly may be a cut-off age where historical data is considered to not be useful (e.g., more than 50 years old). Exemplary attenuation signals may include age (e.g., where certain age ranges of an entry relative to a present time may each be corresponded to a respective discount amount), source (e.g., where different sources have different discount amounts, or no discount amount), and so on.

In an embodiment, a data entry may have more than one artifact corresponding to an anomaly or an attenuation. In such an embodiment, weighting module 232 may discount the data entry based on any or a combination of an artifact corresponding to a largest discount and/or an aggregate of all discounts corresponding to all artifacts within the data entry. In an embodiment, artifacts may be defined by a user or administrator that correspond to a positive signal. The administrator may define an amount of positive weighting that is applied where such artifacts are found in a manner opposite to that of an attenuation signal. Together, the heuristics performed by weighting module 232 may be stored in a data structure and may be collectively referred to as weighting model.

In an embodiment, weighting module 232 may apply some or all of each respective data entry of the historical data into a machine-learned model. The machine-learned model may output a weight. The machine-learned weighting model may be a supervised model or an unsupervised model. Where a supervised model is used, the machine-learned model may be trained using training data having a set of one or more artifacts, where the set is paired with a label representing a weight corresponding to the training data. Thus, the machine-learned model may match each input data entry to a weight based on the training data.

Where an unsupervised model is used, the weighting model may cluster inputs for respective hardware components based on their respective values. The weighting model may determine to not discount values that correspond to clusters, but may determine to discount outlier values that do not fall into clusters. An amount of discount may vary based on distance from a given cluster. A machine-learned model used for weighting in either manner may be referred to herein as a weighting model.

In an embodiment, two or more weighting models may be used. For example, weighting module 232 may determine whether any given data entry of the historical data is suitable for input into the machine-learned weighting model, where suitability may be pre-defined as having pre-defined parameters, such as a pre-defined set of artifacts. As another example, weighting module 232 may determine suitability based on whether at least a threshold number of the artifacts within a given data entry match at least a threshold number of artifacts known to be within the training data by which weighting module 232 was trained, where a sufficient match yields a determination of suitability. Where suitability is determined, weighting module 232 may apply the data entry to the machine-learned weighting model. Where suitability is determined to not exist, weighting module 232 may apply the data entry to a heuristic-driven weighting model. A technical advantage in such a hybrid weighting model system is that accuracy is maximized based on selective use of heuristics versus a machine-learned model. Moreover, applying heuristics is more processor-intensive than applying an entry to a machine-learned model, and thus reducing heuristics to scenarios where a machine-learned weighting model reduces the overall computational power required in determining weightings.

Regardless of whether a machine-learned model, a heuristic model, or a hybrid model is used, in an embodiment, the weighting model may consider data entries in an aggregate form when determining weighting. For example, the weighting model may determine how many data entries of the historical data (e.g., optionally filtering out data entries having anomalies first) relate to a given hardware component. The weighting model may determine not to apply a weight (or to apply a weight of one, thus causing no change) for a value of any data entry corresponding to a hardware component that has fewer than a threshold minimum of corresponding entries in the historical data.

Training module 233 trains a database generation model by using the weights determined by weighting module 232 as applied to the historical data. Training module 233 generates training data by taking an identifier of the hardware component corresponding to each entry of the historical data and pairing it with a label that matches the value indicated in the data entry. Training module 233 applies the weight to the training data, such that, for a given hardware component, the amount of weight any given training data will be given in terms of its value as a source of ground truth is discounted or augmented based on the weight applied thereto. Training module 233 trains the database generation model to take a hardware component identifier as input and to output a corresponding value using the generated training data.

In an embodiment, new data module 234 receives new data also having a hardware component and a respective value. The term new data, as used herein, may refer to data entries having hardware components and respective values that are received by hardware component service 130 after the initial training is performed using the historical data. New data module 234 may continue to receive new data and may batch the new data until a predefined condition is reached. Exemplary predefined conditions may include a threshold amount of new data has been batched, a predefined amount of time has elapsed since a reference point (e.g., a first new data of a batch being received, an interval of time has passed since a last re-training, etc.), and so on. Responsive to determining that the predefined condition has been reached, new data module 234 may determine that the database generation model is to be re-trained.

Re-training module 235 re-trains the database generation model by determining weights for each new data entry using weighting module 232 as applied to the new data. Re-training module 235 then generates new training data in the same manner training module 233 generated training data from the historical data entries. Re-training module 235 then trains the database generation model on the basis of the training data from all historical data (e.g., including any new data from prior re-training sessions) and on the basis of the training data from the new data. In an embodiment, the training data from all historical and new data is pooled and the database generation model is trained on the aggregate pool. Advantageously, in such an embodiment, weighting need not be re-performed on the historical data, as weights may be stored and retrieved for re-training purposes, thus reducing processing power required.

In an embodiment, retrieval of historical data is selectively performed depending on whether new types of data and/or signals form part of the new data. For example, re-training module 235 may determine whether the new training data includes signals and/or data types that were not considered when the database generation model was trained. Responsive to determining that the new training data includes new data types and/or signals, re-training module 235 may generate the aggregate pool using the historical data (e.g., to ensure data relating to that type and/or signal is extracted from the historical data). However, responsive to determining that the new training data does not include new data types and/or signals, re-training module 235 may use the new data without the historical data to re-train the database generation model, modifying existing associations within the database generation model based on the new data. Similarly, where the new training data does not include new data types and/or signals, re-training module 235 may extract from the last (most recent) version of the searchable data structure values for given hardware types, and may generate training data therefrom that labels the hardware type with the value. This may be performed in place of retrieving the historical data, and may be used in conjunction with the new training data to re-train the database generation model. These manners of selectively retrieving the historical data improve on memory and bandwidth efficiency in avoiding retrieval of historical data unless it is necessary.

Searchable database generation module 236 generates a searchable database of hardware components as mapped to other parameters including one or more values associated with those hardware components. Searchable database generation module 236 may generate the searchable database responsive to detecting a trigger. The term trigger, as used herein in this context, may refer to any predefined condition that causes searchable database generation module 236 to generate the searchable database. Exemplary triggers include predefined timing conditions (e.g., a threshold amount of time has passed since a last database generation and/or since a reference time (e.g., amount of time since a most recent new data has been received), a threshold amount of new data has been received since a last generation, and so on). A trigger may also be a command manually entered by a user or an administrator. When searchable database generation module 236 generates the searchable database, a prior version may be replaced (e.g., deleted) by the newly generated version, or the prior version may be stored to memory for reference at a later time.

In order to generate the searchable database, searchable database generation module 236 takes the known hardware component identifiers from a prior searchable database and inputs those into the trained database generation model. The trained database generation model outputs the hardware component identifiers as mapped to their respective values and optionally other information. The other information may include a confidence value that the respective value for a given hardware component is correct. The other information may include any other information relating to the hardware component (e.g., expected time to obtain component, expected amount of time between replacements, identification of similar components, and so on). Database generation module 236 may generate a searchable data structure from the output of the trained database generation model as indexed by hardware component.

In an embodiment, responsive to detecting a trigger, database generation module 236 determines whether there is new data to be synthesized prior to generating the searchable data structure. For example, where the trigger is time-based (rather than based on new data being detected), database generation module 236 may determine responsive to detecting the trigger whether there is new data to be synthesized. Where there is no new data, database generation module 236 may refrain from generating the searchable data structure. This has the technical advantage of improving processing power efficiency, as re-building the searchable database is not needlessly performed where no changes are to be made.

Search module 237 receives a query from a user comprising an indicated hardware component. The manner in which the query is generated is described in further detail with respect to FIG. 3. Search module 237 searches the searchable database for a result matching the query, e.g., by searching for an entry in the searchable database having a hardware component identifier matching the indicated hardware component. Search module 237 outputs a result comprising a value for the indicated hardware component. Optionally, search module 237 also outputs a confidence that the value is correct. The confidence value may be determined based on a variance of values in the training data. The confidence value may be determined based on a recency, variance of values, and volume in the training data. For example, the training data may be labeled with recency values, and the model may lower confidence where recency is farther out or may lower confidence by a predefined amount corresponding to age as mapped to a deprecation of confidence.

In an embodiment, the query may be a request for information. Additionally or alternatively, the query may be in connection with a request to obtain the hardware component. In such an embodiment, matching module 238 receives a second query from another user indicating the another user is in possession of the indicated hardware component. Matching module 238 determines whether a value indicated by the another user matches the value for the indicated hardware component indicated by the result. The matching need not be exact, and may be within a threshold of the hardware component indicated by the result. The threshold may be calculated based on the confidence value (e.g., based on an inverse of the confidence value). For example, where a confidence value of 60% is indicated, the threshold may be determined based by taking the inverse of the 60%, which is 40%, and defining a threshold as a value that is within 40% of the value indicated by the result. The threshold may be defined by the user seeking to obtain the hardware component. Confidence values may be expressed using any numerical representation, and use of percentages is merely exemplary here. For example, confidence values may be expressed using scores (e.g., scores from 1 to 10, where 1 shows a lowest amount of confidence and 10 shows a highest amount of confidence).

Responsive to determining that the value indicated by the another user matches the value for the indicated hardware component indicated by the result, matching module 238 may execute a transaction that causes the user to obtain the indicated hardware component that the another user is in possession of. In an embodiment, responsive to determining the match, matching module 238 may first prompt either or both users to confirm, prior to executing the transaction, where the transaction is executed responsive to receiving authorization from the prompted users based on the prompts.

Cache memory 240 stores data for fast access by hardware component service 130. Fast access is distinguished from slow access, where data is stored in memory remote from hardware component service 130 (e.g., a remote server) or in slower read memory that takes longer to obtain. In an embodiment, historical data (and subsequently, new data) is initially stored in cache memory 240 when received until it is used by weighting module 232 and/or training module 233, and then it is removed from the cache memory 240 (e.g., by deleting the data or moving it to slow access memory). Model database 241 stores models hardware component service 130 uses, including weighting models and database generation models.

Alternative or additional embodiments are possible based on the modules described above. In an embodiment, historical data retrieval module 231 retrieves historical data from a plurality of source databases (e.g., source databases 150) and new data module 234 receives new data from a plurality of input databases (e.g., input database 140) (e.g., again including a respective hardware component identifier and a respective associated value). Hardware component service 130 may generate a synthesized set of data by identifying a second subset of data from the historical data. Training data may be generated using the synthesized set.

Hardware component module 130 may generate the synthesized set of data by segmenting the historical and new data into any number of segments. In an embodiment, a first subset of the combined new and historical data may be identified that is associated with an anomaly. Anomalies may be identified in any manner described in the foregoing. As an example, in an embodiment, hardware component module 130 may input the new data and the historical data into an unsupervised machine learning model, and may receive as output from the unsupervised machine learning model an indication of outlier data (e.g., data that is a threshold distance from any given cluster produced by a clustering model). Hardware component module 130 may assign the outlier data to be part of the first subset of data.

A second subset of the combined new and historical data may be identified that is associated with an attenuation signal. Attenuation signals and entries associated with attenuation signals are subjects that are described in the foregoing and apply equally here. As an example, in an embodiment, hardware component module 130 may identify, from the historical data and the new data, stale data that is dated at least a minimum threshold amount of time from a present time, and may assign the stale data to be part of the second subset of data. In such an embodiment, weighting (e.g., performed by weighting module 232) may weight each entry of the second subset of data based on its respective attenuation signal in a manner that is inversely proportional to a respective amount of time from a present time from a date of the respective entry. A third subset of the combined new and historical data may be identified that includes the remaining data not identified for the first or second subsets.

Hardware component module 130 may update the synthesized set of data by discarding (or weighting to 0) the first subset of data from the synthesized set of data, and by weighting (e.g., using weighting module 232) the second subset of data based on its respective attenuation signal. Where the term "discarding" is used herein, this may refer to either deleting data, or to archiving the data The third subset of data may be not subjected to weighting. Advantageously, this saves on processing power relative to the prior-described embodiment in that weighting, which may be processing-intensive, is only applied to a subset of data, thus improving on processing, memory, and power parameters. Training module 233 may then use the synthesized set of data to train a database generation model, which may be used to generate a searchable database using searchable database generation module 235, with which queries may be processed by search module 237 and/or matching module 238 according to the foregoing.

Figure 3:
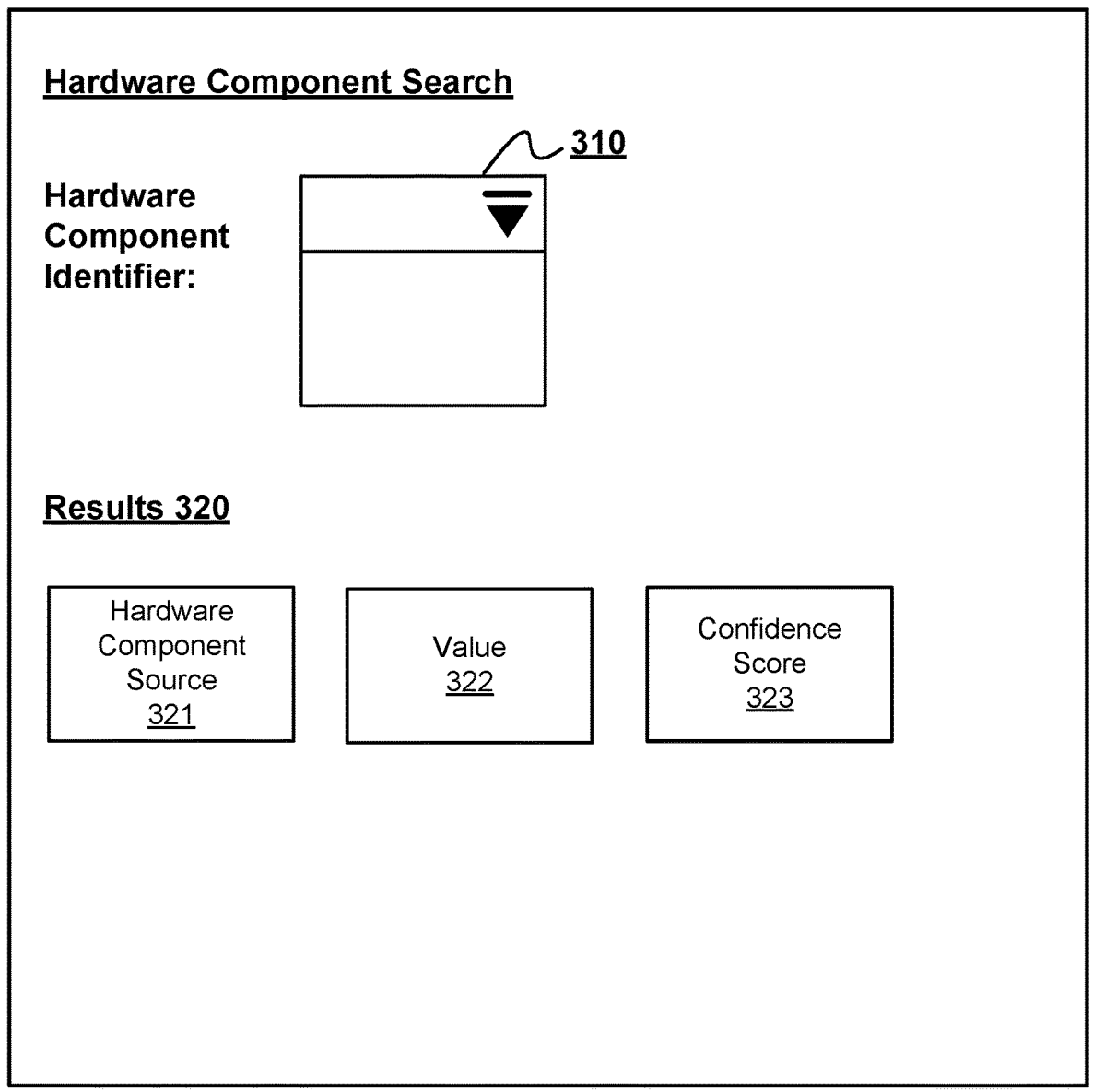
FIG. 3 illustrates one embodiment of a user interface showing exemplary manners of searching for hardware components and receiving results.

FIG. 3 illustrates one embodiment of a user interface showing exemplary manners of searching for hardware components and receiving results. As depicted in FIG. 3, user interface 300 may include search tool 310 and/or results 320. While depicted together, these may be shown in separate screens. Search tool 310 accepts one or more hardware component identifiers. Optionally, search tool 310 may accept additional parameters (e.g., a value, where the person submitting the query is seeking to provide a hardware component). While depicted as a drop-down menu, search tool 310 may accept a hardware component identifier in any known manner (e.g., free text, drop-down, and so on). There may be many ways to identify a hardware component, and any known mechanism may be input (e.g., scan QR code or bar code using a camera sensor, manually input a serial number, inputting a name, and so on).

Results 320 may include any data corresponding to a given hardware component identifier. Hardware component source 321 is a source from which a hardware component may be obtained. Value 322 is a value corresponding to the hardware component identifier as determined using the trained database generation model. Confidence score 323 is a confidence value by the trained database generation model as determined based on variance in the training data. Any other data corresponding to a given hardware component may be included in results 320 (e.g., availability data, lead time to acquire, etc.).

Computing Machine Architecture

Figure 4:
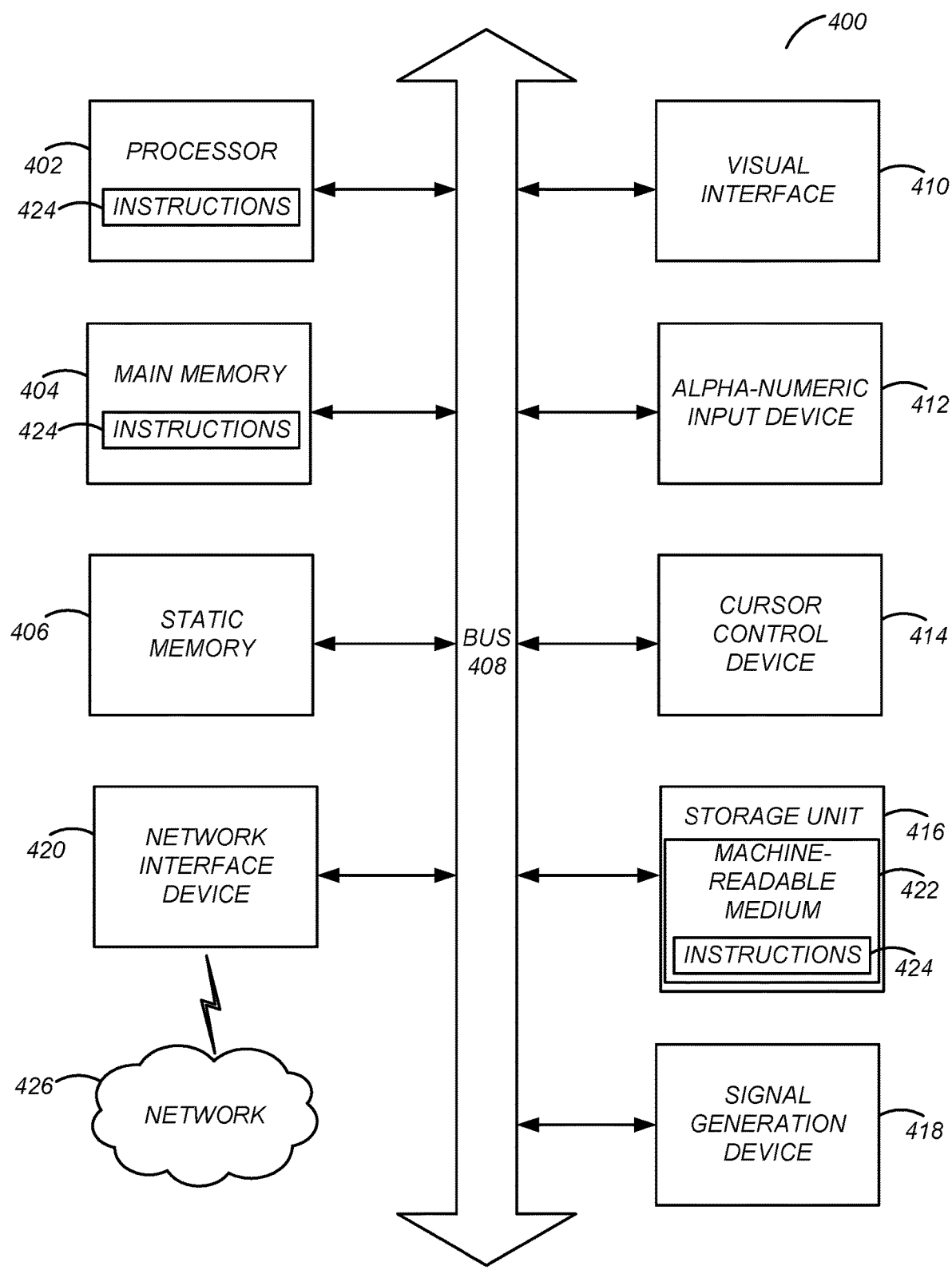
FIG. 4 is a block diagram illustrating components of an example machine able to read instructions from a machine-readable medium and execute them in a processor (or controller).

FIG. (FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines (e.g., a database cluster and/or a server cluster) that individually or jointly execute instructions 124 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alpha-numeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Exemplary Processes for Using Hardware Component Service

Figure 5:
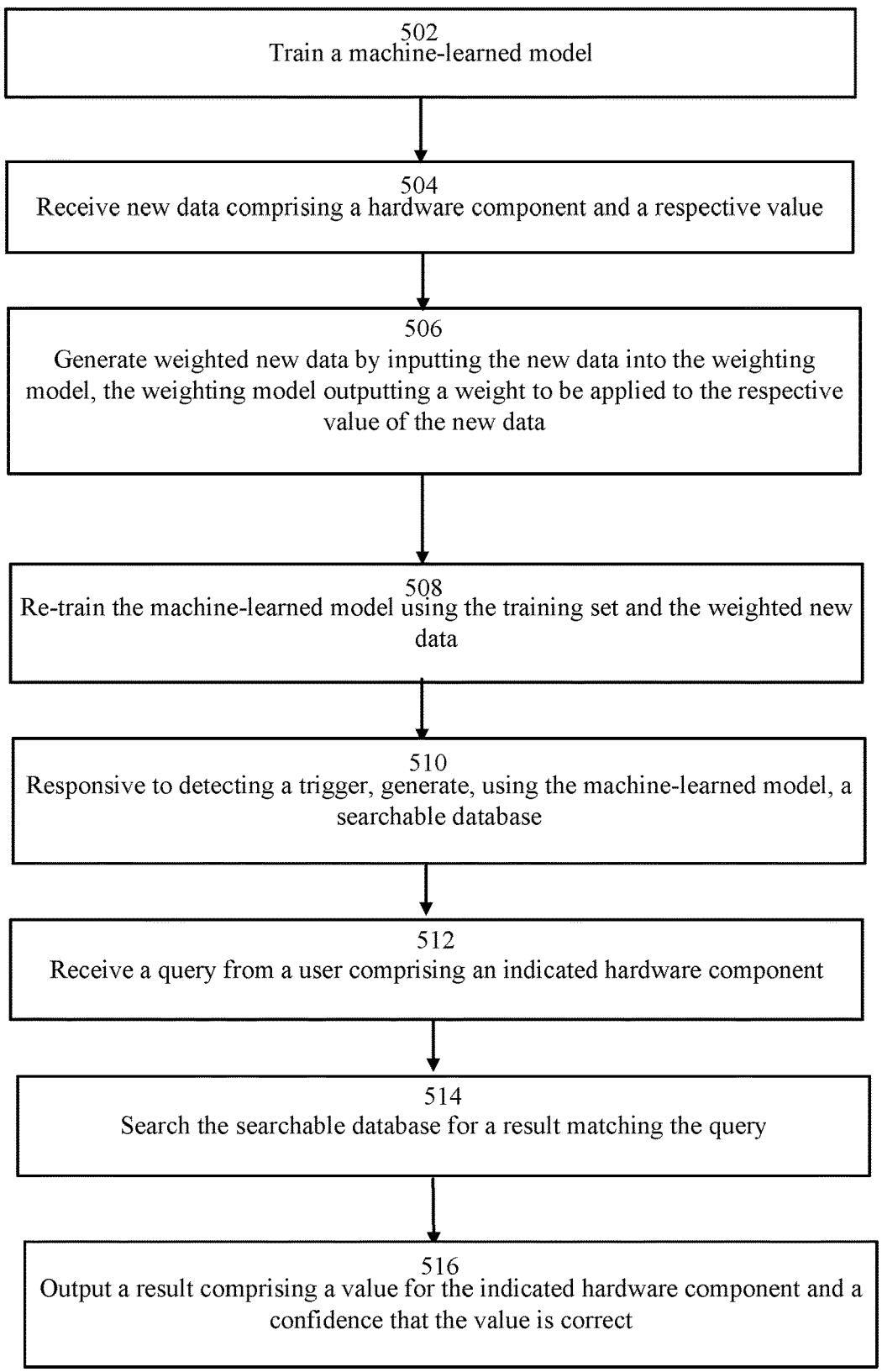
FIG. 5 is a flow diagram showing an exemplary process for training a machine learning model to generate a searchable database relating to hardware components.

FIG. 5 is a flow diagram showing an exemplary process for training a machine learning model to generate a searchable database relating to hardware components. Process 500 begins with one or more processors 402 of hardware component service 130 executing one or more modules to perform operations including training 502 a machine-learned model. The training includes retrieving a plurality of entries from a database (e.g., using historical data retrieval module 231), each entry corresponding a respective hardware component to a respective value, inputting at least a portion of data of each respective entry into a weighting model (e.g., a weighting model of model database 241, applied using weighting module 232), the weighting model outputting a weight to be applied to each respective value, generating a training set, the training set having training data formed by pairing each respective hardware component as a label as paired to their respective values as weighted by their respective weights, and training (e.g., using training module 233) the machine-learned model using the training set.

Hardware component service 130 receives 504 new data comprising a hardware component and a respective value (e.g., using new data module 234) and generates 506 weighted new data (e.g., also using weighting module 232) by inputting the new data into the weighting model, the weighting model outputting a weight to be applied to the respective value of the new data. Hardware component service re-trains 508 the machine-learned model using the training set and the weighted new data (e.g., using re-training module 235). Responsive to detecting a trigger, hardware component service 130 generates 510, using the machine-learned model, a searchable database (e.g., using searchable database generation module 236). Hardware component service 130 receives 512 a query from a user comprising an indicated hardware component, and searches 514 the searchable database for a result matching the query (e.g., using search module 237). Hardware component service 130 outputs 516 a result (e.g., result 320 of search interface 300) comprising a value for the indicated hardware component and a confidence that the value is correct (e.g., confidence score 323).

FIG. 6 is a flow diagram showing another exemplary process for generating a searchable database. Process 600 begins with one or more processors 402 of hardware component service 130 executing one or more modules to perform operations including retrieving 602 historical data (e.g., using historical data retrieval module 231) from a plurality of source databases (e.g., source databases 150), the historical data comprising entries each including a hardware component identifier and an associated value. Hardware component service receives 604 new data (e.g., using new data module 234) from a plurality of input databases (e.g., one or more input databases 140), the new data comprising a respective hardware component identifier and a respective associated value.

Hardware component service 130 generates 606 a synthesized set of data by identifying a first subset of data comprising data from the historical data and the new data that is associated with an anomaly, identifying a second subset of data from the historical data and the new data that is associated with an attenuation signal, and identifying a third subset of data from the historical data and the new data that includes data not assigned to the first subset or the second subset. Hardware component service 130 updates 608 the synthesized set of data by discarding (or archiving) the first subset of data from the synthesized set of data and weighting each entry of the second subset of data based on its respective attenuation signal (e.g., using weighting module 232).

Hardware component service 130 generates 610 a searchable database, the searchable database including each hardware component named by an entry of the synthesized set of data, along with an associated value determined based on the weighted value of the entry. Hardware component service 130 receives 612 user input of a search query, and outputs 614 search results (e.g., using user interface 300) based on a comparison of the user input of the search query to entries of the searchable database.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for identifying aircraft hardware components and corresponding information through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims. While hardware components described herein are generally referred to as "aircraft" components, the term aircraft is not intended to be limiting, and hardware components for any other item may be used instead.

What is claimed is:

1. A method comprising:
   retrieving historical data from a plurality of source databases, the historical data comprising entries each including a hardware component identifier and an associated value;
   receiving new data from a plurality of input databases, the new data comprising a respective hardware component identifier and a respective associated value;
   generating a synthesized set of data by:
      identifying a first subset of data comprising data from the historical data and the new data that is associated with an anomaly;
      identifying a second subset of data from the historical data and the new data that is associated with an attenuation signal; and
      identifying a third subset of data from the historical data and the new data that includes data not assigned to the first subset or the second subset;
   updating the synthesized set of data by:
      discarding the first subset of data from the synthesized set of data; and
      modifying the second subset of data by weighting each entry of the second subset of data based on its respective attenuation signal, the synthesized set of data thereby including the third set of data and the modified second subset of data;
   generating a searchable database, the searchable database including each hardware component named by an entry of the updated synthesized set of data, along with an associated value determined based on the weighted value of the entry;
   receiving user input of a search query; and
   outputting search results based on a comparison of the user input of the search query to entries of the searchable database.

2. The method of claim 1, further comprising, responsive to generating the synthesized set of data, discarding the historical data and the new data from cache memory.

3. The method of claim 1, wherein identifying the first subset of data from the historical data and the new data that is associated with an anomaly comprises:
   inputting the new data and the historical data into an unsupervised machine learning model;
   receiving as output from the unsupervised machine learning model an indication of outlier data; and
   assigning the outlier data to be part of the first subset of data.

4. The method of claim 1, wherein identifying the second subset of data comprising data from the historical data and the new data that is associated with an attenuation signal comprises:
   identifying, from the historical data and the new data, stale data that is dated at least a minimum threshold amount of time from a present time; and
   assigning the stale data to be part of the second subset of data.

5. The method of claim 4, wherein weighting each entry of the second subset of data based on its respective attenuation signal comprises weighting each respective entry in a manner that is inversely proportional to a respective amount of time from a present time from a date of the respective entry.

6. The method of claim 1, wherein the hardware component is an airplane component.

7. The method of claim 1, wherein generating the synthesized set of data occurs responsive to receiving the new data.

8. The method of claim 1, wherein generating the synthesized set of data occurs responsive to a defined point in time being reached.

9. A non-transitory computer-readable medium comprising memory with instructions installed thereon that, when executed, cause one or more processors to perform operations, the instructions comprising instructions to:
   retrieve historical data from a plurality of source databases, the historical data comprising entries each including a hardware component identifier and an associated value;
   receive new data from a plurality of input databases, the new data comprising a respective hardware component identifier and a respective associated value;
   generate a synthesized set of data by:
      identifying a first subset of data comprising data from the historical data and the new data that is associated with an anomaly;
      identifying a second subset of data from the historical data and the new data that is associated with an attenuation signal; and
      identifying a third subset of data from the historical data and the new data that includes data not assigned to the first subset or the second subset;
   update the synthesized set of data by:
      discarding the first subset of data from the synthesized set of data; and
      modifying the second subset of data by weighting each entry of the second subset of data based on its respective attenuation signal, the synthesized set of data thereby including the third set of data and the modified second subset of data;
   generate a searchable database, the searchable database including each hardware component named by an entry of the updated synthesized set of data, along with an associated value determined based on the weighted value of the entry;

receive user input of a search query; and output search results based on a comparison of the user input of the search query to entries of the searchable database.

10. The non-transitory computer-readable medium of claim 9, the instructions further comprising instructions to, responsive to generating the synthesized set of data, discard the historical data and the new data from cache memory.

11. The non-transitory computer-readable medium of claim 9, wherein the instructions to identify the first subset of data from the historical data and the new data that is associated with an anomaly comprise instructions to:

input the new data and the historical data into an unsupervised machine learning model;

receive as output from the unsupervised machine learning model an indication of outlier data; and assign the outlier data to be part of the first subset of data.

12. The non-transitory computer-readable medium of claim 9, wherein the instructions to identify the second subset of data comprising data from the historical data and the new data that is associated with an attenuation signal comprise instructions to:

identify, from the historical data and the new data, stale data that is dated at least a minimum threshold amount of time from a present time; and assign the stale data to be part of the second subset of data.

13. The non-transitory computer-readable medium of claim 12, wherein weighting each entry of the second subset of data based on its respective attenuation signal comprises weighting each respective entry in a manner that is inversely proportional to a respective amount of time from a present time from a date of the respective entry.

14. The non-transitory computer-readable medium of claim 9, wherein the hardware component is an airplane component.

15. The non-transitory computer-readable medium of claim 9, wherein generating the synthesized set of data occurs responsive to receiving the new data.

16. The non-transitory computer-readable medium of claim 9, wherein generating the synthesized set of data occurs responsive to a defined point in time being reached.

17. A system comprising:

memory with instructions encoded thereon; and one or more processors that, when executing the instructions, are caused to perform operations comprising:

retrieving historical data from a plurality of source databases, the historical data comprising entries each including a hardware component identifier and an associated value;

receiving new data from a plurality of input databases, the new data comprising a respective hardware component identifier and a respective associated value;

generating a synthesized set of data by:

identifying a first subset of data comprising data from the historical data and the new data that is associated with an anomaly;

identifying a second subset of data from the historical data and the new data that is associated with an attenuation signal; and identifying a third subset of data from the historical data and the new data that includes data not assigned to the first subset or the second subset;

updating the synthesized set of data by:

discarding the first subset of data from the synthesized set of data; and modifying the second subset of data by weighting each entry of the second subset of data based on its respective attenuation signal, the synthesized set of data thereby including the third set of data and the modified second subset of data;

generating a searchable database, the searchable database including each hardware component named by an entry of the updated synthesized set of data, along with an associated value determined based on the weighted value of the entry;

receiving user input of a search query; and outputting search results based on a comparison of the user input of the search query to entries of the searchable database.

18. The system of claim 17, the operations further comprising, responsive to generating the synthesized set of data, discarding the historical data and the new data from cache memory.

19. The system of claim 17, wherein identifying the first subset of data from the historical data and the new data that is associated with an anomaly comprises:

inputting the new data and the historical data into an unsupervised machine learning model;

receiving as output from the unsupervised machine learning model an indication of outlier data; and assigning the outlier data to be part of the first subset of data.

20. The system of claim 17, wherein identifying the second subset of data comprising data from the historical data and the new data that is associated with an attenuation signal comprises:

identifying, from the historical data and the new data, stale data that is dated at least a minimum threshold amount of time from a present time; and assigning the stale data to be part of the second subset of data.

* * * * *